United States Patent Office 3,794,563
Patented Feb. 26, 1974

3,794,563
PREPARATION OF IMMOBILIZED ENZYMES
Sidney Alan Barker and John Frederick Kennedy, Birmingham, and John Epton, Stourbridge, England, assignors to Aspro-Nicholas Limited, Slough, Buckinghamshire, England
No Drawing. Filed Aug. 18, 1972, Ser. No. 281,854
Claims priority, application Great Britain, Sept. 1, 1971, 40,859/71; Nov. 17, 1971, 53,320/71
Int. Cl. C07g 7/02
U.S. Cl. 195—63                           9 Claims

ABSTRACT OF THE DISCLOSURE

Biologically active proteins are supported on polymers having chelating sites defined by pairs of adjacent hydroxy and carboxylic acid groups. Preferred polymers are poly-N-acryloyl-aminosalicylic acids. The protein can be complexed with the polymer by mixing together in aqueous media.

---

The present invention relates to enzyme-polymer complexes wherein the polymer constitutes a solid support for the enzyme. As used in this specification the term "enzyme" includes like biologically active proteins such as antibodies and antigens unless it is clear from the context that true enzymes are meant.

There has been much interest in recent years in the use of water-insoluble derivatives of enzymes and the like biologically active proteins such as antibodies and antigens to reduce the difficulties inherent in working with these relatively unstable water-soluble substances. Such derivatives are termed "solid phase enzymes" or "insoluble enzymes" and a number are now available commercially. The solid phase enzymes prepared or proposed to date fall into four distinct categories as follows:

(1) Adsorption type;
(2) Ionic type;
(3) Entrapped type; and
(4) Covalent type.

In the first type of solid phase enzyme the enzyme is adsorbed onto an inert support, such as glass beads, charcoal, or polysaccharides, for example cellulose. A major disadvantage of this type of solid phase enzyme is that because of the weakness of the physical adsorption bonding desorption of the enzyme may occur with changes in inter alia ionic strength, temperature and pH values.

In the second type of solid phase enzyme, the enzyme is bound by ionic bonding to a poly-ionic carrier, such as a methacrylic acid co-polymer or another charged polymer in the form of an ion exchange resin. Unfortunately, the poly-ionic carrier rarely confers the desired level of stability on the attached enzyme.

In the third type of solid phase enzyme, the enzyme is physically entrapped within a polymeric matrix in the form of a molecular sieve such as a cross-linked polyacrylamide gel. The principle disadvantages of this type of solid phase enzyme is its relative inaccessability to large molecules and diffusion of the enzyme from the carrier with small amounts of the enzyme still leaking out even after exhaustive washing of the solid phase enzyme.

In the fourth type of solid phase enzyme, the enzyme is co-valently bound under mild conditions to a reactive group of a polymer, such as acrylamide copolymers available under the trademark "Enzacryls." Most modern work concerning solid phase enzymes has been concerned with this type of covalently bound material. However, the reactive conditions required for the covalent bonding have to be carefully controlled in order to avoid destruction of the enzyme molecule and it is usually difficult to strip exhausted enzyme from the polymer to enable the polymer to be re-charged with fresh enzyme.

The inventors have now found that if polymers having chelating sites defined by pairs of adjacent hydroxy and carboxylic acid are used as solid supports for enzymes, the bond between the enzyme and support is such that many disadvantages of the aforementioned prior art type of solid phase enzymes are overcome. In particular the enzyme can be attached to and stripped from the polymer under relatively mild conditions. Generally a desirable level of enzyme stability is shown by the solid phase enzyme.

According to the present invention therefore, there is provided a complex of a biologically active protein such as an enzyme, antibody or antigen with a polymer having recurring chelating sites defined by pairs of adjacent hydroxy and carboxylic acid radicals, some or all of which sites optionally are chelated with metallic or the like ions. It is thought that the enzyme component is attached to the polymer at the chelating sites but the precise nature of the bonding has not yet been ascertained. The enzyme-polymer complex of this invention has the enzyme bound to the polymer with sufficient strength for the polymer to constitute a solid support for the enzyme. Sometimes this bond strength is low enough to enable the enzyme to be readily stripped from the polymer by treatment with aqueous strong salt or aqueous buffer. However, sometimes the enzyme solubilizes in the presence of its substrate.

Polymers having chelating sites have been known for a good number of years and have been employed for such purposes as extracting metallic and the like ions from aqueous solutions thereof. Examples of such polymers are salicylic acid-formaldehyde polymers (see U.S. Pat. 3,089,885 and U.S. Pat. 3,035,022) and Schiff bases prepared from salicylaldehyde and polyamines (see U.S. Pat. 3,089,885). For the purposes of the present invention, the chelating sites on the polymer are defined by pairs of adjacent hydroxy and carboxylic acid radicals. Preferably the polymer has recurring aromatic nuclei on adjacent ring carbon atoms of which a said pair of radicals are substituents. More preferably, the polymers contain recurring orthohydroxybenzoic acid groups, the hydroxy and carboxylic acid radicals of which groups define chelating sites. Such polymers may be homopolymers of orthohydroxybenzoic acids having as a ring substituent an ethylenically unsaturated radical or copolymers of such an orthohydroxybenzoic acid derivative and one or more ethylenically unsaturated comonomers. The unsaturated radical may be of the formula

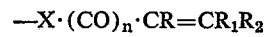

wherein each R independently represents hydrogen, alkyl of one to six carbon atoms or halogen, $n$ represents 0 or 1 and X represents a direct bond, oxygen, sulphur,

or methylene. Preferred unsaturated radicals are those of the formula

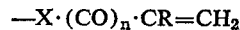

where R represents methyl or, more preferably, hydrogen, $n$ and X are as defined supra but more preferably $n$ is 1 and X is —NH—. Advantageously, the ethylenically unsaturated radical is in the four or five position of the phenyl ring.

Examples of the preferred polymers for use in this invention are homopolymers and copolymers, especially with acrylamide, of N-acryloylaminosalicylic acids, for example N-acryloyl-4 or 5-aminosalicylic acids. Such polymers may be cross-linked with, for example, N-methylene-bis-acrylamide.

Some or all of the chelating sites of the polymer may be chelated with metallic or the like ions, for example titanium or borate ions.

The enzymes which can be attached to any particular polymer will be dependent upon the precise nature of the enzyme and of the polymer. Such factors as steric hindrance may, for example, prevent a particular enzyme from being bound to a particular polymer. However, the suitability of a particular polymer as a solid support for a particular enzyme may be determined by simple experimentation in the same manner as the suitability of prior art supports are assessed for this purpose. Examples of specific enzyme/polymer systems which have been shown to be satisfactory as solid phase enzymes are as follows:

β-glucosidase/titanium complex of N-acryloyl-4-aminosalicylic acid homopolymer;
β-glucosidase/titanium complex of N-acryloyl-5-aminosalicylic acid homopolymer;
lactate dehydrogenase/borate complex of N-acryloyl-4-aminosalicylic acid homopolymer;
lactate dehydrogenase/N-acryloyl-4-aminosalicylic acid homopolymer;
β-glucosidase/N-acryloyl-4-aminosalicylic acid homopolymer;
β-glucosidase/N-acryloyl-5-aminosalicylic acid homopolymer;
lactate dehydrogenase/borate complex of N-acryloyl-5-aminosalicylic acid homopolymer;
lactate dehydrogenase/N-acryloyl-5-aminosalicylic acid homopolymer;
α-amylase/titanium complex of N-acryloyl-4-aminosalicylic acid homopolymer;
α-amylase/titanium complex of N-acryloyl-5-aminosalicylic acid homopolymer;
glucamylase/titanium complex of N-acryloyl-4-aminosalicylic acid homopolymer;
glucamylase/titanium complex of N-acryloyl-5-aminosalicylic acid homopolymer;

The polymer-enzyme complexes may be formed by simply mixing the enzyme with aqueous suspensions of the polymer and subsequently separating the solids content by, for example, a centrifuge, from the supernatant liquor.

The solid phase enzymes of this invention may be used in place of the soluble and often relatively unstable enzymes in industrial processes involving enzymic reactions. Alternatively, they may be used to isolate the enzyme from a solution thereof thereby assisting purification of the enzyme. Other uses will be readily apparent to those skilled in the art.

In use the polymer-enzyme complexes may be packed into a column including a solid inert support medium such as glass beads and the raw material charged to the column in aqueous solution. During passage of said solution through the column, the enzymes cause the desired enzymic reaction of the raw material to take place.

Other industrially useful enzymes which may be bound to polymers in accordance with this invention are:

Glucose isomerase    Invertase
Lipase               Lactase
Cellulase            Protease
Catalase             Pectinase
Glucose oxidase The following examples are given to illustrate the present invention. The following abbreviations have been used:

poly-4-acid=N-acryloyl-4-aminosalicylic acid homopolymer
poly-5-acid=N-acryloyl-5-aminosalicylic acid homopolymer
O.D.=Optical density at specified wavelength

EXAMPLE 1

Interaction of borate complexed and uncomplexed poly-4-acid with lactate dehydrogenase Lactate dehydrogenase (10 μl.) was added to duplicate samples of free and borate complexed poly-4-acid. The mixtures were immediately centrifuged to separate respectively free and borate complexed poly-4-acid/lactate dehydrogenase complex.

Preparation of borate complexed and uncomplexed poly-4-acid

The polymers used in the experiment reported above were prepared as follows:

Sodium 4-aminosalicylate (400 g.) and sodium bicarbonate (60 g.) were dissolved in distilled water (250 ml.) and stirred for one hour. Two additions of acryloyl chloride were made (20 ml. and 10 ml.), the solution being stirred for one hour after each addition. The solution thus obtained was made slightly acid (pH 4–5) by addition of 10 N hydrochloric acid, filtered and washed with distilled water (500 ml.). N-acryloyl-4-aminosalicylic acid was recrystallized from aqueous ethanol in a yield of 27.0 g. This acid had a melting point of 227–229° C. and analyzed as follows:

Calculated for $C_{10}H_9O_4N$ (percent): C, 58.0; H, 4.35; N, 6.76. Found (percent): C, 57.7; H, 4.35; N, 6.65.

The N-acryloyl-4-aminosalicylic acid (15.0 g.) and borax (9.36 g.) were dissolved in distilled water (180 ml.) and the pH adjusted to 9.0 with 10 N sodium hydroxide. Azobisisobutyronitrile (150 mg.) in ethanol (50 ml.) was added and the solution heated at 80° C. for 48 hours in a flask fitted with a reflux condenser. The resulting viscous solution was diluted with distilled water (200 ml.) and a white polymer precipitated as a heavy white flocc by adding 5 N hydrochloric acid to pH 2. The polymer was washed ten times with 1 l amounts of distilled water by decantation. The polymer was then rotary evaporated with methanol to remove any remaining boric acid. The polymer was stored as a suspension in distilled water (200 ml.).

To assess the percentage of water of the polymer, a weighed quantity of filtered polymer was dried over phosphorus pentoxide in vacuo at 60° C. On drying, a hard, brittle, brown, translucent solid resulted. The filtered polymer contained 93% by weight of water.

The borate complexed polymer was obtained by suspending the filtered polymer (93% $H_2O$, 500 mg.) in an aqueous solution (1.0 ml.) of borax (100 mg./ml.). The pH of the mixture was adjusted to 7.0 and the polymer removed by centrifuging.

The uncomplexed polymer was obtained by suspending the filtered polymer (93% $H_2O$, 500 mg.) in distilled water (1.0 ml.). The pH was adjusted to 7.0, the sample centrifuged and the supernatant removed.

The borate complexed polymer may also be obtained by diluting the viscous solution supra for polymerizing N-acryloyl-4-amino salicylic acid (5 g.) with distilled water (70 ml.) and then dialyzing the solution for 48 hours against 10 changes (5 liters each) of 0.0005 M borate buffer (pH 7.0).

Removal of lactate dehydrogenase from poly-4-acid/lactate dehydrogenase complex

A sample of poly-4-acid/lactate dehydrogenase complex prepared as above was centrifuged and an aliquot of supernatant withdrawn. The remaining supernatant was removed, the polymer washed with distilled water in three amounts (1.0 ml. each) and finally washed with 1 M lactic acid solution (1.0 ml.). Aliquots (500 μl.) from each wash were used in a lactate dehydrogenase assay for pyruvic acid using sodium pyruvate (0.4 μmol) in distilled water (1.0 ml.). Control assays also were carried out using the said sodium pyruvate solution (Control A)

and using a sodium pyruvate solution in 1 M lactic acid (0.4 μmol in 1.0 ml.) (Control B). The results are set forth in the following table:

|  | Initial O.D. at 340 nm. | Final O.D. at 340 nm. | Difference |
|---|---|---|---|
| Initial supernatant | 1.240 | 0.630 | 0.610 |
| Water wash 1 | 1.200 | 0.910 | 0.290 |
| Water wash 2 | 1.140 | 0.940 | 0.200 |
| Water wash 3 | 1.100 | 0.960 | 0.140 |
| Lactic acid wash | 1.100 | 0.215 | 0.885 |
| Control A | 1.204 | 0.162 | 1.042 |
| Control B | 1.170 | 0.136 | 1.034 |

The above results indicate that poly-4-acid takes up lactate dehydrogenase and that the lactate dehydrogenase can be removed from said complex by washing with strong enzyme substrate, i.e. lactic acid.

It should be noted that in the present case the enzyme/polymer complex has no enzymic activity although it is a source of the active enzyme. This lack of activity in the solid enzyme is probably due to the similarity in structure between the orthohydroxy-acid grouping in the polymer and the α-hydroxy-acid grouping in lactic acid.

EXAMPLE 2

Interaction of uncomplexed poly-4-acid and poly-5-acid with lactate dehydrogenase and with glucamylase (A) Poly-5-acid (5 g.) was dispersed in distilled water (10 ml.) with a tissue grinder. Aliquots of the dispersed polymer (1.0 ml.) were adjusted to the required pH values with 5 N HCl or NaOH. Solutions of lactate dehydrogenase (10 μl.) were added to each aliquot and left for half an hour before centrifuging. The residue was washed twice with distilled water (1 ml.), centrifuging after each wash. Finally, the polymer was washed twice with 1 M lactic acid (1.0 ml.) and centrifuged. Each supernatant was assayed for lactate and dehydrogenase actipity. The results are set forth in the following table:

| pH | First supernatant | Wash 1 (Difference in O.D. 340 nm.) | Wash 2 | Lactic acid wash |
|---|---|---|---|---|
| 2 | 0.93 | 0.91 | 1.06 | 1.08 |
| 3 | 0.73 | 0.66 | 0.05 | 1.15 |
| 4 | 0.54 | 0.30 | 0.26 | 1.25 |
| 5 | 0.45 | 0.16 | 0.34 | 1.49 |
| 6 | 0.20 | 0.11 | 0.14 | 1.15 |
| 7 | 0.00 | 0.25 | 0.29 | 1.53 |
| 8 | 0.07 | 0.20 | 0.26 | 1.36 |
| 9 | 0.07 | 0.13 | 0.00 | 1.45 |

The above results indicate that poly-5-acid complexes an increasing proportion of lactate dehydrogenase with increasing pH in the range 2 to 9.

(B) An aliquot (2.0 ml.) of suspended polymer was centrifuged and the residue washed twice with acetate buffer (pH 4.5). An aqueous solution of glucamylase (1.0 ml. 18.6 μg./ml.) and lactate dehydrogenase (10μl.) was added to the polymer and the mixture centrifuged. The residue was washed twice with water (1.0 ml.) and with 1 M lactic acid, centrifuging after each wash. Each supernatant after enzyme addition was assayed for lactate dehydrogenase and glucamylase activity. The results are set forth in the following table:

LDH assay:                   Diff. in O.D. 340 nm.
    First supernatant _____ 0.09
    Wash 1 _____ 0.37
    Wash 2 _____ 0.04
    1 M lactic acid wash _____ 1.67

Glucamylase assay:        Diff. in O.D. 460 nm.
    First supernatant _____ 0.609
    Wash 1 _____ 0.235
    Wash 2 _____ 0.039
    1 M lactic acid wash _____ 0.060

The above results indicate that lactate dehydrogenase is complexed in preference to glucamylase by poly-5-acid, thereby indicating a route for separating the said enzymes.

(C) The procedure (A) reported above was repeated using poly-4-acid giving the following results:

| pH | First supernatant | Wash 1 (Difference in O.D. 340 nm.) | Wash 2 | Lactic acid wash |
|---|---|---|---|---|
| 2 | 0.80 | 0.52 | 0.46 | 0.68 |
| 3 | 0.79 | 0.43 | 0.40 | 0.80 |
| 4 | 0.42 | 0.40 | 0.26 | 0.80 |
| 5 | 0.10 | 0.24 | 0.00 | 0.90 |
| 6 | 0.20 | 0.00 | 0.10 | 0.92 |
| 7 | 0.07 | 0.11 | 0.00 | 0.92 |

NOTE.—(Poly-4-acid tended to gel above pH 7). Standard 0.92.

The above results indicate that poly-4-acid complexes an increasing proportion of lactate dehydrogenase with increasing pH in the range 2 to 7.

(D) The procedure (B) reported above was repeated using poly-4-acid giving the following results:

Lactate dehydrogenase assay:    Diff. O.D. 340 nm.
    First supernatant _____ 0.32
    Water wash 1 _____ 0.20
    Water wash 2 _____ 0.10
    1 M lactic acid wash _____ 0.85

Glucamylase assay:         Activity [1] (mg./l./m.)
    First supernatant _____ 15
    Water wash 1 _____ 5
    Water wash 2 _____ 0
    1 M lactic acid wash _____ 0

[1] Weight of glucose released from standard starch solution.

The above results indicate that lactate dehydrogenase is complexed in preference to glucamylase by poly-4-acid, thereby indicating a route for separating the said enzymes.

(E) The procedure (B) reported above was repeated using only glucamylase (1 ml., 18.6 μg./ml.) and washing with acetate buffer (1 ml., pH 4.5) giving the following glucamylase assay:

Activity [1] (mg./l./m.)
First supernatant _____ 14
Buffer wash 1 _____ 5
Buffer wash 2 _____ 0
Standard _____ 18

The above results indicate that poly-5-acid does not complex with glucamylase (cf. Example 5 hereinafter).

Preparation of poly-5-acid

The poly-5-acid used in (A), (B) and (C) above was prepared by the method described in Example 1 for preparing the poly-4-acid but using 5-aminosalicylic acid (40 g.) instead of the sodium 4-aminosalicylate to yield 25.8 g. of N-acryloyl-5-aminosalicylic acid. Melting point 218–219° C.

Analysis.—Calculated (percent): C, 58.0; H, 4.35; N, 6.75. Experimental (percent): C, 57.5; H, 4.5; N, 6.5.

The final polymer product was pink in color.

Borate complexed poly-5-acid may be prepared as described in Example 1 but commencing with the 5-aminosalicylic acid or poly-5-acid as appropriate.

EXAMPLE 3

Interaction of titanium complexed and uncomplexed poly-4-acid and poly-5-acid with β-glucosidase The following samples were coupled wih β-glucosidase in the manner set forth:

Sample No.:
    4A—dried titanium complexed poly-4-acid
    4B—desiccated titanium complexed poly-4-acid
    4C—uncomplexed poly-4-acid
    5A—dried titanium complexed poly-5-acid
    5B—desiccated titanium complexed poly-5-acid
    5C—uncomplexed poly-5-acid Each sample (20 mg.) was washed five times (5 mins. each wash) with distilled water. $\beta$-Glucosidase (1 mg.) in distilled water (5 mls.) was added to each sample and the mixture stirred at about 4° C. for 16 hours. The mixtures were centrifuged and the respective supernatant removed. An aliquot (25 ml.) was taken from the initial enzyme solution and another from each supernatant after coupling. These aliquots were assayed to determine enzyme take-up by the polymer. The samples were washed five times (5 mins. each wash) with distilled water and the supernatant removed. 0.005 M acetate buffer (pH 5) (2 mls.) was added and an aliquot taken for assay.

The aliquots supra were assayed by measuring the release of O-nitro phenyl anion from a solution of O-nitro phenyl-$\beta$-D-glucopyranoside. The results obtained are set forth in the following table:

| Sample | Initial enzyme sol$^n$ (25 $\mu$l aliquot) | Supernatant after coupling (25$\mu$l) (Difference | Solid in O.D. 420 nm.) |
|---|---|---|---|
| 4A | 0.80 | 0.052 | 2.0 |
| 4B | 0.80 | 0.048 | >2.0 |
| 4C | 0.80 | 0.034 | 2.0 |
| 5A | 0.80 | 0.064 | >2.0 |
| 5B | 0.80 | 0.050 | 1.95 |
| 5C | 0.80 | 0.062 | 1.30 |
| Reagent blank | 0.014 | 0.042 | 0.013 |

The above results show that almost all of the $\beta$-glucosidase in the initial solutions was taken up by the polymer samples.

The activity of the solid phase enzymes thus obtained was not significantly decreased by washing 10 times (5 mins. each) with 0.005 M acetate buffer; 0.1 M acetate buffer or 0.5 M calcium chloride. However 5 five-minute washings with 1 M sucrose in 1 M sodium chloride followed by 5 five-minute washings with 0.005 M acetate buffer reduced the activity to approximately one-third of its pre-wash level.

The titanium-complexed polymers used as samples 4A, 4B, 5A and 5B were prepared as follows:

Poly-4-acid obtained as in Example 1 was washed twice with 5 N hydrochloric acid and then twice with distilled water and then suspended in 12.5% w./v. titanous chloride (10 ml.) and stirred for 15 mins. The mixture was filtered to remove any oxidizing agent leaving an orange colored solid.

The sample was divided into two parts, one of which was dried overnight in an oven at 45° C. to give sample 4A. The second part was left overnight in a desiccator at 4° C. to give sample 4B.

The corresponding 5-amino complex was obtained by the method above but using pink poly-5-acid obtained as in Example 2 instead of the white poly-4-acid. The solid remaining after filtration was dark brown in color. This sample was divided into two and treated as above to obtain samples 5A (corresponding to 4A) and 5B (corresponding to 4B).

EXAMPLE 4

Interaction of titanium complexed poly-4-acid and poly-5-acid with $\alpha$-amylase Samples (20 mg.) 4A, 4B, 5A and 5B as defined in Example 3 were each washed five times (2 mins. each wash) with distilled water (5 ml). The final supernatant was removed, $\alpha$-amylase from Bacillus subtilis (1 mg.) in distilled water (5 ml.) added to each sample, and the mixture stirred for 16 hours at 4° C. The supernatant was removed and the digest washed five times with distilled water (5 ml.) and ten times (two minutes each wash) with 0.1 M acetate buffer pH 5 (5 ml.).

The solid phase enzymes were then suspended in 0.005 M acetate buffer pH 5 (2 mls.) and stirred until a homogeneous suspension was obtained. Aliquots (1 ml. for 4A and 5A and 0.5 ml. for 4B and 5B) of the solid phase enzyme were then assayed for starch conversion to maltose using the method of Bernfeld et al. (Samuelson and Stramberg, Carbohydrate Research 3 (1966), 89). The activity of the solid phase enzymes were as follows:

| | Activity units [1]/mg. |
|---|---|
| 4A | 2.56 |
| 4B | 2.27 |
| 5A | 1.51 |
| 5B | 4.44 |

[1] One $\alpha$-amylase unit was taken to be that which liberated reducing sugar equivalent to 1$\mu$ mole of maltose at 20° C. in 1 minute.

The above results indicate that $\alpha$-amylase is complexed by titanium complexed poly-4-acid and by titanium complexed poly-5-acid and that the solid phase enzymes thus obtained have significant enzymic activity.

EXAMPLE 5

Interaction of titanium complexed poly-4-acid and poly-5-acid with glucamylase

The procedure of Example 4 was repeated using 5 ml. of Agidex glucamylase preparation (approx. 1 mg./ml.) instead of the $\alpha$-amylase.

Aliquots (0.5 ml.) of a homogeneous suspension of the solid phase enzyme in 0.005 M acetate buffer pH 4.5 (2 ml.) were assayed for starch conversion to glucose using the method of Bernfeld et al. The activity of the solid phase enzymes were as follows:

| | Activity units [1]/mg. |
|---|---|
| 4A | 0.304 |
| 4B | 0.630 |
| 5A | 0.323 |
| 5B | 0.450 |

[1] One glucamylase unit was taken to be that which liberated reducing sugar equivalent to 1$\mu$ mole of glucose at 45° C. in 1 minute.

The above results indicate that glucamylase is complexed by titanium completed poly-4-acid and by titanium complexed poly-5-acid and that the solid phase enzymes thus obtained have significant enzymic activity.

The variation of activity of the solid phase enzyme with the number of times used was determined by washing the digest of the above assay with 0.1 M acetate buffer pH 5 (5 ml., 2 mins.), removing the supernatant, suspending the digest in 0.005 M acetate pH 5 (1 ml.) and repeating the assay. This procedure was then repeated twice more. The decrease in activity, as a percentage of the original activity was as follows:

| | Use | | | |
|---|---|---|---|---|
| | 1st | 2d | 3d | 4th |
| Sample: | | | | |
| 4A | 100 | 58 | 54 | 47 |
| 4B | 100 | 58 | 46 | 35 |
| 5A | 100 | 60 | 61 | 57.5 |
| 5B | 100 | 72.5 | 63.5 | 59.5 |

The above results indicate that after an initial loss of some 30–40%, the enzymic activity of the solid phase enzymes remains at a useful and reasonably constant level with re-use. Such solid phase enzymes have been used over periods of 10 to 20 hours without dropping to an uneconomic activity level.

EXAMPLE 6

N-acryloyl-4-aminosalicylic acid homopolymer-titanium complex (20 mg.) prepared as described below was washed five times with distilled water (5 ml., two mins. each wash) and the final supernatant removed. γ-Amylase (5 mg.) in distilled water was added and the digest stirred for 16 hours at 4° C. An aliquot (25 μl.) was taken from each supernatant and assayed for enzyme activity by starch to glucose conversion using the method of Bernfeld et al. (Samuelson and Stramberg, Carbohydrate Research 3 (1966) 89).

The solid was washed ten times with 0.1 M acetate buffer (pH 5.0; 5 mls.; two mins. each wash). After removal of the final supernatant the digest was suspended in 0.005 M acetate buffer (pH 5.0; 2 ml.). Aliquots (500 μl.) of the digest were then assayed for enzyme activity as above.

The results of the assays for enzyme activity are set forth hereinafter in Table 1.

The N-acryloyl-4-aminosalicylic acid homopolymer-titanium complex used in this example was prepared as follows:

N-acryloyl-4-aminosalicylic acid (15 gm.) was suspended in distilled water (180 ml.) and borax (9.36 gm.) added. The pH was adjusted to 9 with 10 N sodium hydroxide and azobisisobutyronitrile (150 mg.) in ethanol (50 ml.) added and the solution heated at 80° C. for 48 hours on a water bath. After dilution of the solution with distilled water (200 ml.) the white polymer was precipitated by the addition of 2 N hydrochloric acid. This was washed ten times with distilled water (1 l. portions) by decantation and then rotary evaporated with ethanol five times and finally suspended in distilled water (200 ml). Yield 14.2 gm. dry wt.

The polymer thus obtained (1 gm.) was stirred with 12.5% w./v. titanic chloride (10 ml.) for twenty minutes to produce an orange colored solid which was filtered and washed with distilled water (100 ml.) at the pump. Yield 980 mg. dry wt.

EXAMPLE 7

The procedure of Example 6 was repeated using N-acryloyl-5-aminosalicylic acid homopolymer - titanium complex prepared as in that example but using N-acryloyl-5-aminosalicylic acid instead of the corresponding 4-amino acid to yield a pink homopolymer and a reddish-brown homopolymer-titanium complex.

The results of the assays for enzyme activity are set forth in Table 1.

EXAMPLE 8

The procedure of Example 6 was repeated using N-acryloyl - 4 - aminosalicylic acid homopolymer - titanium complex prepared as follows:

N-acryloyl-4-aminosalicylic acid (1 gm.) was suspended in distilled water (20 ml.) and the pH adjusted until constant 9.0. At this stage the monomer was soluble. Azobisisobutyronitrile (10 mg.) in ethanol (10 ml.) was added to the solution which was then heated at 80° C. for 48 hours on a water bath. 2 N hydrochloric acid was used to precipitate the white polymer which was washed with distilled water (250 ml.) by decantation.

The polymer (1 gm.) was stirred with 12.5% w./v. titanic chloride (10 ml.) for twenty minutes and the resulting yellow/orange solid filtered and washed with distilled water (100 ml.). Yield 612 mg. dry wt.

The results of the assays for enzyme activity are set forth in Table 1.

EXAMPLE 9

The procedure of Example 8 was repeated using N-acryloyl - 5 - aminosalicylic acid homopolymer - titanium complex prepared as in that example but using N-acryloyl-5-aminosalicylic acid instead of the corresponding 4-amino acid.

The results of the assays for enzyme activity are set forth in Table 1.

EXAMPLE 10

The procedure of Example 6 was repeated using N-acryloyl - 4 - aminosalicylic acid homopolymer - titanium complex prepared as follows:

N - acryloyl - 4 - aminosalicylic acid (1 gm.) was suspended in distilled water (20 ml.) and the pH adjusted until constant 4.5 with 10 N sodium hydroxide. To the resulting solution azobisisobutyronitrile (10 mg.) in ethanol (10 ml.) was added and the solution heated at 80° C. for 48 hours on a water bath. Dilution of the solution by distilled water (20 ml.) was followed by the addition of 12.5% w./v. titanic chloride (20 ml.) to precipitate the yellow/orange titanium complex. This was filtered and washed with distilled water (200 ml.) at the pump. Yield 920 mg.

The results of the assays for enzymes activity are set forth in Table 1.

EXAMPLE 11

The procedure of Example 10 was repeated using N-acryloyl - 5 - aminosalicylic acid homopolymer - titanium complex prepared as in that example but using N-acryloyl-5-aminosalicylic acid instead of the corresponding 4-amino acid.

The results of the assays for enzyme activity are set forth in Table 1.

TABLE 1

| Ex. | Measure of activity, nm. mg. glucose | Time of digest (10 mins.) Supernatant | Time of digest (10 mins.) Solid | Dry wt. (mg.) | Initial rate of glucose release (mg./min.) | Enzyme, units/mg. polymer |
|---|---|---|---|---|---|---|
| 6 | 520 | 0.007 | {0.031 / 0.110} | 5.9 | 0.110 | 0.104 |
| 7 | 520 | 0.002 | 0.001 | | | |
| 8 | 520 | −0.002 | {0.064 / 0.180} | 5.1 | 0.180 | 0.196 |
| 9 | 520 | −0.002 | {0.024 / 0.130} | 4.8 | 0.130 | 0.155 |
| 10 | 520 | −0.002 | {0.089 / 0.210} | 5.5 | 0.210 | 0.211 |
| 11 | 520 | −0.010 | {0.086 / 0.208} | 6.6 | 0.208 | 0.175 |

We claim:

1. A polymer-enzyme complex wherein an enzyme is bonded to a homopolymer of orthohydroxybenzoic acid having as a ring substituent an ethylenically unsaturated radical or a copolymer of said orthohydroxybenzoic acid and at least one ethylenically unsaturated comonomer, said ethylenically unsaturated radical being of the formula —X(CO)$_n$.CR=CR$_1$R$_2$ wherein each R independently represents hydrogen, C$_1$-C$_6$ alkyl or halogen, $n$ represents 0 or 1 and X represents a direct bond, oxygen, sulphur, —NH— or methylene, said enzyme being bonded to said polymer through at least one of recurring chelating sites defined by pairs consisting of hydroxy radicals adjacent to carboxylic acid radicals of the polymer and at least one reactive site of the enzyme.

2. The complex according to claim 1 wherein the enzyme is bonded directly to the polymer at the said chelating site.

3. The complex according to claim 1 wherein the enzyme is bonded to an ion chelated to the polymer at the said chelating site.

4. The complex according to claim 1 wherein the orthohydroxybenzoic acid monomer is selected from N-acryloyl-4-aminosalicylic acid and N-acryloyl-5-aminosalicylic acid.

5. The complex according to claim 1 wherein the enzyme is glucamylase, the polymer is N-acryloyl-4-aminosalicylic acid homopolymer or N-acryloyl-5-aminosalicylic acid homopolymer, and at least some of the chelating sites of said compound are chelated with a titanium ion.

6. The complex according to claim 5 wherein the polymer is N-acryloyl-4-aminosalicylic acid homopolymer and the chelating ion is a titanous ion.

7. The complex according to claim 3 wherein the chelating ion is selected from titanous, titanic and borate ions.

8. The complex according to claim 7 wherein the enzyme is selected from the group consisting of glucosidase, lactate dehydrogenase, ampylase, glucamylase and pectinase.

9. The complex according to claim 8 wherein the enzyme is glucamylase.

References Cited

UNITED STATES PATENTS 3,650,900  3/1972  Levin et al. _____ 195—63

DAVID M. NAFF, Primary Examiner

U.S. Cl. X.R.

195—68, DIG 11